Patented Jan. 20, 1931

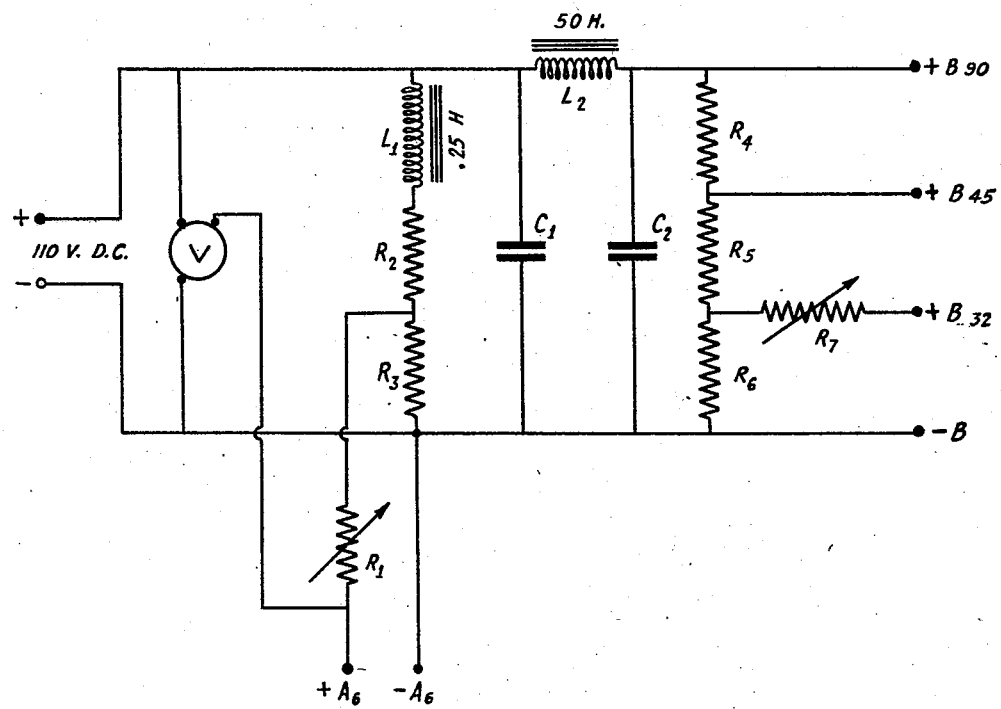

1,789,348

UNITED STATES PATENT OFFICE

ERNEST V. AMY, OF NEW YORK, N. Y., ASSIGNOR TO RADIO CORPORATION OF AMERICA, A CORPORATION OF DELAWARE

BATTERY SUBSTITUTE

Application filed June 29, 1927. Serial No. 202,307.

The present invention relates to an "A" and "B" battery eliminator for radio apparatus and more particularly to means for providing a constant potential to the filaments and plates of vacuum tubes of a radio receiving set from a commercial direct current supply.

It is customary in the operation of radio receiving sets to use a storage battery, commonly called the "A" battery, to supply the filament current and a number of dry cells, commonly called the "B" battery to supply the necessary plate potential. In order to obtain satisfactory operation, it becomes necessary to keep the storage or "A" battery continually charged and this requires a great deal of care and attention. On the other hand, the dry cells or "B" battery, while in operation, undergo a constant decrease in terminal potential. When they are first installed, they function in a first class manner, but their efficiency in operation is almost directly proportional to the length of time that they are in operation. Their decrease in terminal potential and increase in internal resistance finally become so great that they must be removed from the circuit and new ones substituted.

In order to obviate the necessity of continually recharging the storage battery and replacing the "B" battery, the present invention is concerned with a circuit arrangement capable of changing the value and the characteristics of the potential from a 110 volt, commercial direct current supply, so that it may be used on the filaments and plates of the tubes in a radio receiver, without distortion or line ripples.

My invention will best be understood by reference to the following description taken in connection with the accompanying drawing in which the single figure shows a schematic wiring diagram of the circuit arrangement which is the subject of this disclosure.

Between the leads from the 110 volt D. C. supply are connected a pair of condensers $C_1$ and $C_2$ of two microfarads each. A choke coil $L_2$ of approximately fifty henries is connected in the positive lead between these condensers. The coil $L_2$ together with condensers $C_1$ and $C_2$ constitute a small filter which is sufficient for suppressing the "ripple" which is created in the D. C. generator at the power house. Resistances $R_4$, $R_5$ and $R_6$ in series are connected across the line, and the necessary voltages are tapped off this resistance. In the figure, which is merely illustrative of my invention, the 45V tap is taken off between $R_4$ and $R_5$ and the 22V tap is taken off between $R_5$ and $R_6$. The detector plate potential taken from the 22V tap is controlled by the rheostat $R_7$. The 90V tap and the $-B$ tap are connected to the positive and negative leads, respectively.

For obtaining the filament current, a current choke $L_1$ is connected to the positive lead of the line supply in front of choke $L_2$, and connected in series with $L_1$ are resistances $R_2$ and $R_3$, the latter being connected to the negative lead of the line supply, from which point the 6V negative tap is taken off. From between the resistances $R_2$ and $R_3$ a connection is made for the 6V positive lead, a variable resistance or rheostat $R_1$ being provided to control the filament current. The outstanding feature of the unit is the disposition of the choke $L_1$. Connecting $L_1$ in series with the common positive lead for the "A" and "B" supply or entirely removing same from the circuit has proved entirely unsatisfactory.

The location and relative function of the choke coil $L_1$ in the above circuit arrangement is the novel and important feature of this invention.

It was found by experience after numerous experiments with choke coils, condensers and resistances in various combinations and networks for "A" and "B" battery elimination that the above circuit was the only one which gave satisfactory operation i. e. no noticeable ripple in the receiver output when operating from a power supply socket which had bad inductive interference from sparking motors or where line commutator ripples were admittedly bad, with the use of only two choke coils for the complete eliminator.

It was found that the most serious noises from the average house lighting circuit introduced in a receiver operating from an "A" and "B" eliminator come from the "A" supply. The usual method of attempting to smooth this "A" supply is to introduce large inductances in series with the filament supply leads to the receiver and in series with and preceding the plate smoothing choke $L_2$. This method was only found to work on very quiet circuits where very little ripple or induction noises were present.

My method is to shunt the D. C. power supply with an inductance in series with a resistance. The function of the inductance is to offer a high reactance to the line disturbances and to keep them from the filament supply voltage to the receiver which is obtained from the drop across this series resistance shown at $R_2$.

It was found by experiment that this shunt choke method of smoothing the "A" supply voltage was more effective and required only half the number of choke coils required by any other known method and still obtain satisfactory operation under all line conditions.

The circuit arrangement as disclosed is positive in operation and satisfactory in all respects, the output voltages remaining constant under all circumstances.

Having thus described the nature of my invention, I claim:

1. A circuit arrangement adapted to feed currents of constant potential to the filaments and anodes of thermionic tubes in radio receivers from a direct current source including, a current carrying choke coil and a resistance in series connected directly across the terminals of said source, a second choke coil connected directly to the positive terminal of said source, a pair of condensers connected from one side of said source to the terminals of said last named choke to form with said choke an effective filter, a resistance connected across the terminals of said filter, a plurality of anode potential terminals connected to points on said resistance, a variable resistance in one of said connections, and a pair of filament current terminals one of which is connected to the negative side of said source and the other of which is connected through a variable resistance to a point on said series resistance.

2. In radio apparatus adapted to supply currents of substantially constant potential to the filaments and anodes of vacuum tubes in radio receiving sets from a direct current source, a current carrying choke and a series resistance connected directly across said source, a filament current supply including a lead taken through a variable resistance from a point on the series resistance and a second lead taken from a terminal of said source, a condenser in parallel with said series choke and resistance, a high impedance choke coil having one end connected directly to one terminal of the source and to the first named choke coil, a condenser connecting the other end of said high impedance to the other terminal of said source, a resistance parallel to said last named condenser, a plurality of terminals connected to points on said resistance, and a variable resistance in one of said connections.

3. In a circuit arrangement for obtaining anode current and filament current of constant potential from a direct current source, a high impedance choke coil connected directly to the positive terminal of said source for smoothing out the ripples in the plate current, a condenser connecting one end of said choke coil to the negative end of said source, a second choke coil having an inductance of substantially ¼ henry and a resistance in series therewith connected directly across the terminals of said source and a filament supply comprising a pair of leads one taken from a point on said resistance the other being taken from the negative side of said supply.

ERNEST V. AMY.